United States Patent [19]

Shiono et al.

[11] Patent Number: 4,607,334

[45] Date of Patent: Aug. 19, 1986

[54] ELECTRONIC CASH REGISTER HAVING A CHECK AND ADJUSTMENT MODE WHERE REGISTRATION INPUT OPERATIONS ARE INDICATED IN A MACHINE-LOCK CONDITION

[75] Inventors: Fusahiro Shiono, Habikino; Kensaku Komai, Yamatokoriyama, both of Japan

[73] Assignee: Sharp Kabushiki Kaisha, Osaka, Japan

[21] Appl. No.: 515,505

[22] Filed: Jul. 20, 1983

[30] Foreign Application Priority Data

Jul. 30, 1982 [JP] Japan .................... 57-133933

[51] Int. Cl.[4] ........................................... G06F 15/20
[52] U.S. Cl. ....................................... 364/405; 364/900
[58] Field of Search ........................... 364/400–401, 364/404–406, 200 MS File, 900 MS File; 235/2, 7 A, 7 R

[56] References Cited

U.S. PATENT DOCUMENTS 4,312,037  1/1982  Yamakita ...................... 364/405
4,360,872 11/1982  Suzuki et al. ................. 364/405
4,408,292 10/1983  Nakatani et al. .............. 364/405
4,428,049  1/1984  Miyazaki ...................... 364/405
4,450,526  5/1984  Nakatani et al. .............. 364/405
4,458,317  7/1984  Horigome et al. ............. 364/406
4,471,434  9/1984  Iwawaki ....................... 364/405

Primary Examiner—Gary V. Harkcom
Attorney, Agent, or Firm—Birch, Stewart, Kolasch & Birch

[57] ABSTRACT

An electronic cash register includes a mode selector for selecting a registration mode or a check and adjustment mode. The memories for the storage of various sales are adjusted during the check and adjustment mode to correct errors. The pre-adjustment information is retained until a clear operation is selected by the operator. A machine-locked condition is established in response to the adjustment operation. In response to the machine-locked condition any key input other than those used during the check and adjustment mode are inhibited. The machine-locked condition is removed when the pre-adjustment information is erased during a clear operation.

1 Claim, 7 Drawing Figures

ELECTRONIC CASH REGISTER HAVING A CHECK AND ADJUSTMENT MODE WHERE REGISTRATION INPUT OPERATIONS ARE INDICATED IN A MACHINE-LOCK CONDITION

BACKGROUND OF THE INVENTION

This invention relates to an electronic cash register and, more particularly, to an improvement of the checking and adjusting mode of operation in an electronic cash register.

With a prior art cash register, when a certain adjusting operation is performed, the contents stored in a memory tend to be automatically cleared in response to the completion of the adjusting operation. Therefore, it has often been experienced that a plurality of reports on the adjustment can not be issued at the same time. By way of example, where the adjustment is carried out by printing on a slip, the contents stored in the memory are automatically cleared in response to the completion of the adjustment and, therefore, the adjustment report can not be retained in the form as printed on a journal.

In addition, a recording medium for a slip printer is, as compared with a receipt journal printer, liable to result in a paper jamming and/or paper breakage and, accordingly, once this sort of trouble happens during the adjusting operation, there is a great risk that no adjustment report can be obtained.

Furthermore, while it often happens that the same report is required in a plural number in the case of a slip report, a number of identical adjustment reports can not be obtained except for a single slip of adjustment report because the contents stored in the memory are readily cleared automatically in response to the completion of the adjustment.

Because of the reasons stated above, only a single check report can be obtained as a slip report according to the prior art.

SUMMARY OF THE INVENTION

Accordingly, the present invention has been developed with a view to substantially eliminating the disadvantages and inconveniences inherent in the prior art electronic cash register and has for its essential object to provide an electronic cash register of an improved type wherein the contents stored in the memory will not be automatically cleared in response to the completion of the adjusting operation.

Another important object of this invention is to provide an electronic cash register of the type referred to above wherein a machine-locked condition in which any key input other than a check and adjustment mode is inhibited can be automatically established in response to the adjusting operation.

According to the present invention, these objects can be accomplished by providing an electronic cash register with a mode setting means for setting a check and adjustment mode, means for causing memories for the storage of various sales to execute an adjustment operation during the check and adjustment mode, means for establishing a machine-locked condition in response to the adjustment operation while the storage of sales contents are retained in such memories, and means operable in response to the machine-locked condition for inhibiting any key input other than during the check and adjustment mode. With this construction, the electronic cash register according to this invention is placed in the machine-locked condition after the adjustment of the sales storage memory and before the clearing of such sales storage memory and, in this condition, only a key manipulation associated with the check and adjustment mode can be enabled.

Accordingly, after the adjusting operation of, for example, the memory for the storage of routine sales on all items, the machine-locked condition is established while the contents thereof are retained and, under this condition, only the key manipulation associated with the check and adjustment mode (the checking and adjusting operation of such memory) is enabled so that a desired number of copies of an adjustment report of such memory for the storage of the routine sales on all items can be obtained on the slips.

In addition, by way of example, during the machine-locked condition and subsequent to the adjusting operation of the memory for the storage of the routine sales on all items, it is also possible to perform a receipt journal (R/J) adjustment, for example, a memory adjustment of the sales during each time interval (R/J Print). Also, and the slip adjustment report (copy) may be obtained in two ways during the machine-locked condition; the adjustment report of the memory for the storage of the sales on all items and the adjustment report of the memory for the storage of the sales during each time interval.

BRIEF DESCRIPTION OF THE EMBODIMENT

These and other objects and features of the present invention will become clear from the detailed description of a preferred embodiment taken with reference to the accompanying drawing, in which.

DETAILED DESCRIPTION OF THE EMBODIMENT

Figure 1:
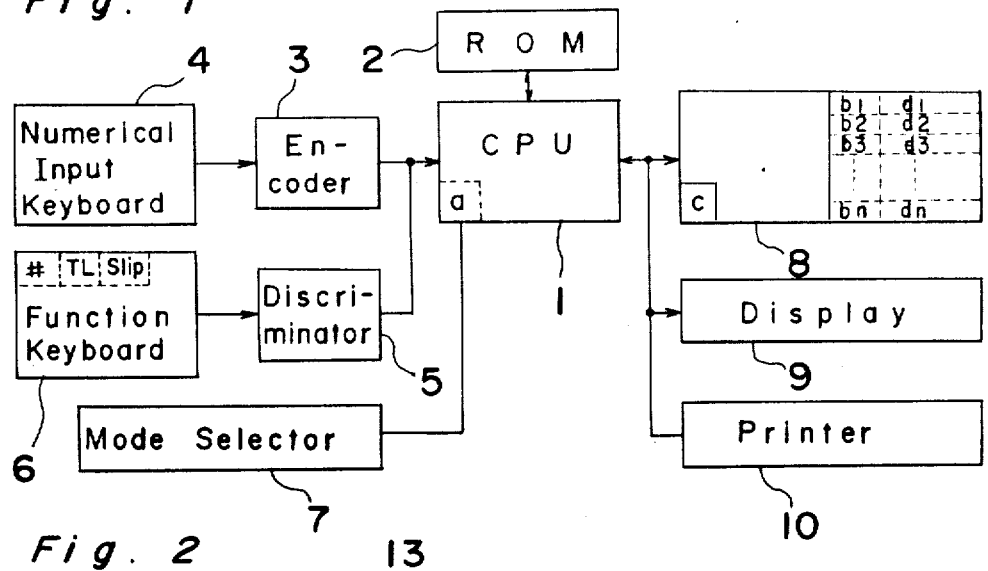
FIG. 1 is a circuit block diagram showing an electronic cash register embodying this invention.

Referring first to FIG. 1, an electronic cash register embodying this invention comprises a central processing unit (CPU) 1 for processing information of various transactions, to which is connected a read-only memory 2 storing a program defining the procedures to deal with the various transactions, a numerical input keyboard 4 for supplying thereto through a key encoder 3 number information or money information associated with each of the transactions, a function keyboard 6 having a plurality of function keys for supplying thereto through a key discriminator 5 an instruction representing a particular procedure to deal with registration data associated with the respective transaction, a mode selector 7 for selecting the mode of operation of the device (i.e., one of setting, registration, and check and clear modes), a memory unit 8 for storing data of the respective transaction, a display unit 9 for providing a visual indication of the transaction data, and a printer 10 for printing the result of the respective transaction on a recording medium such as, for example, a receipt form, a journal or a slip.

An RAM area of the CPU 1 has a mode storage area a for the storage of information related to operating mode of the register. The ROM 2 stores a processing program necessary to process and execute one of the setting, checking, adjusting and registering operations.

The function keyboard 6 includes a JOB specifying key # for specifying the type and number of checks and adjustments, during the check and adjustment mode or jobs such as, for example, the clearing memories; a job executing key TL for instructing and executing receipt journal adjustment; and a job executing key slip for instructing and executing a slip adjustment.

The memory unit 8 includes a storage area b for the storage of a machine-locked condition (b1 to bn representing machine-lock flag storage areas for respective items), a storage area c for the storage of a mode for initiating a machine-locked condition, and a sales data storage area d for the storage of data relating to sales for all items. The sales data storage area d is divided into a data storage area d1 for the storage of data relating to routine sales for each item, a data storage area d2 for the storage of sales for each cash, a data storage area d3 for the storage of data relating to sales for each clerk, a data storage area d4 for the storage relating to data of sales for each time interval, a PLU sales data storage area d5, a data storage area d6 for the storage of monthly sales for all clerks, and a data storage area d7 for the storage of monthly sales for all departments.

The mode selector 7 has mode selection positions for selecting a first check and adjustment mode (X1/Z1) for executing the adjustment of the monthly sales for all items, the adjustment of the sales for all cashers, the adjustment for all clerks, the adjustment of the sales for each time interval and the sales adjustment of PLU (price lock-up); and a second check and adjustment mode (X2/Z2) for executing the adjustment of the monthly sales for all clerks and the adjustment of the monthly sales for all departments.

Figure 6A:
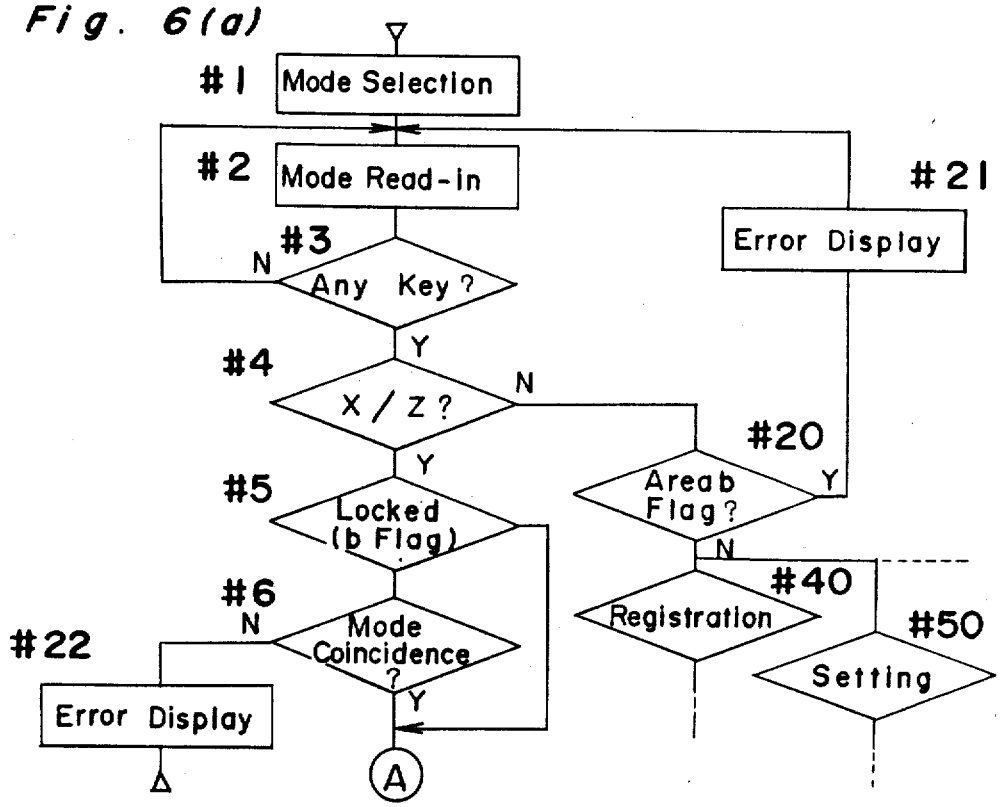
FIG. 6, being comprised of FIGS. 6(a) and 6(b), is a flow chart showing the sequence of operation of the cash register shown in FIG. 1.
Figure 6B:
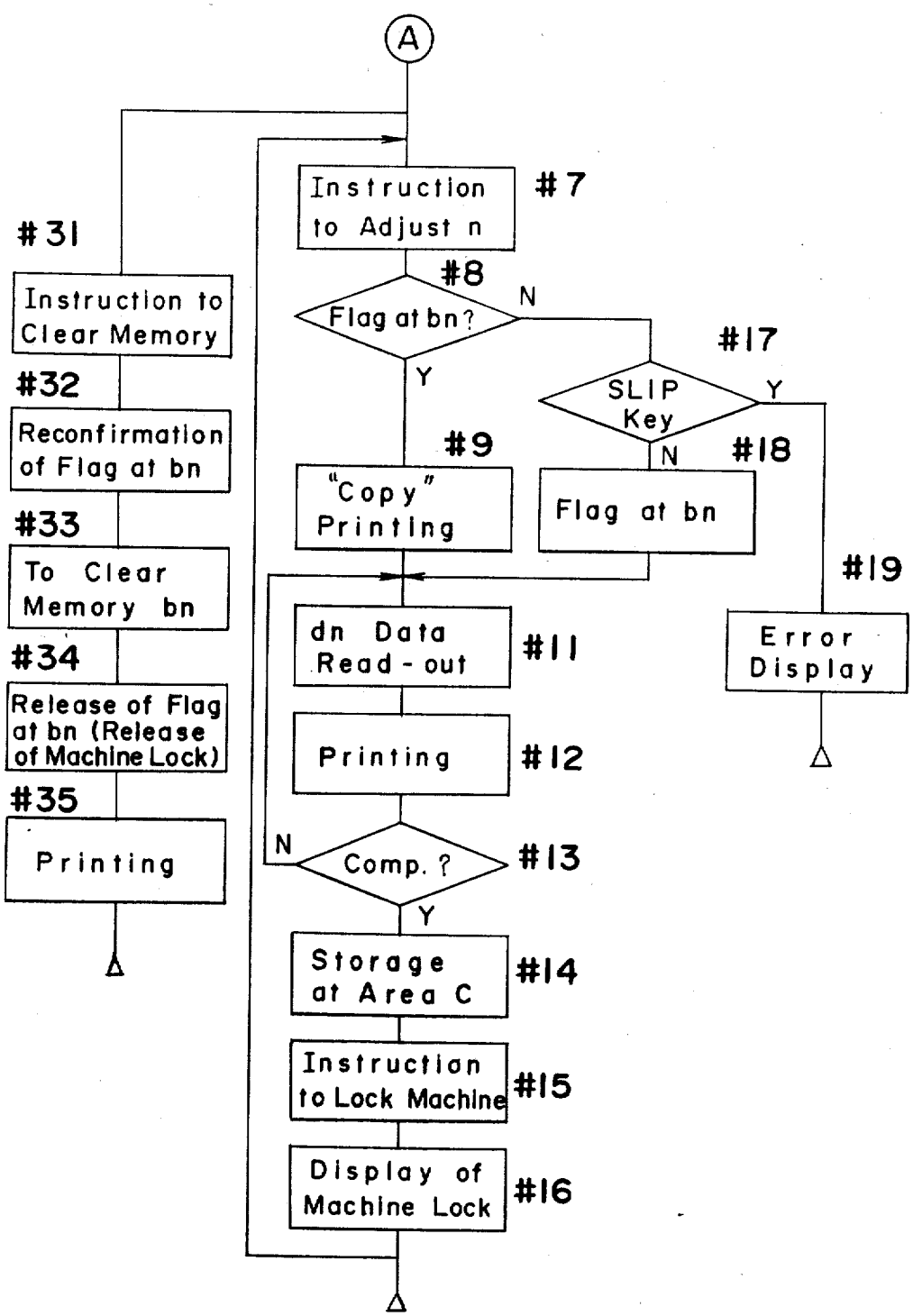

The operation, especially the check and adjustment operation, of the electronic cash register constructed as hereinbefore described will now be described with reference to the flow chart shown in FIG. 6.

When the electronic cash register embodying this invention is to be used, an operator should, in the first place, selects a desired mode by means of the mode selector 7 as shown by a MODE SELECTION block #1, thereby setting information of the selected mode in the storage area a of the CPU 1 as shown by a MODE READ-IN block #2.

When the operator subsequently manipulates keys on either the input keyboard 4 or the function keyboard 6 for carrying out a registering procedure as shown by a ANY KEY? block #3, the CPU 1 determines, as shown by a X/Z? block #4, whether or not the selected mode is the check and adjustment mode (X/Z). If the selected mode is determined other than the check and adjustment mode, the next determining step #20 as shown by an AREA b, FLAG? block, is performed to determine whether or not a flag is set up in the area b (b1 to bn) of the memory unit 8, that is, whether or not the cash register is in a machine-locked condition, and if the flag is determined set in the area b, the display is effected by means of the display unit 9, as shown by an ERROR DISPLAY block #21, to indicate the occurrence of an error in selecting the mode or any other manipulation. On the other hand, if the result of the determination at the step #20 is No, that is, if the flag is not set in the area b (b1 to bn), various data are processed in accordance with the selected operating mode.

More specifically, the operation thereof differs according to each mode, and since the operation under the registration mode, shown by a REGISTRATION block #40, and the setting mode shown by a SETTING block #50 is substantially identical with that performed by the conventional cash register, the details thereof are herein omitted for the sake of brevity. Therefore, only the check and adjustment operation associated with this invention will be described.

Referring to the determining block #4, and if the result of the determination is Yes, that is, if the first check and adjustment mode is selected, the CPU 1 determines, as shown by a LOCKED? block #5 whether or not a flag is set in the area b of the memory unit 8, that is, whether or not the machine-locked condition is established. If the machine-locked condition is established, a determining step shown by a MODE COINCIDENCE block #6 is performed to determine whether or not the machine-locked condition is established during the first or second check and adjustment mode which has previously performed during the previous manipulation. Specifically, if the machine-locked condition was established in response to the adjustment operation during the second check and adjustment mode, the key manipulation during the first check and adjustment mode is inhibited and this condition is subsequently displayed by the display unit 9 as shown by an ERROR DISPLAY block #22.

An INSTRUCTION TO ADJUST n step shown by a block #7 is then carried out to instruct the adjustment. By way of example, where the adjustment of the sales for all items (Receipt journal printing) is to be executed, a JOB number (for example, "1") associated with the all-item sales adjustment, the JOB specifying key # and the executing key TL must be successively manipulated to instruct the CPU 1 to perform the adjustment of the sales for all items as shown by the block #7. At the subsequent step #8 shown by a FLAG AT bn? block, the CPU 1 upon receipt of this instruction determines whether or not the flag is set in the area b1 of the memory unit 8, that is, whether or not it is the first adjusting operation performed to the storage area d1. If the flag is not set, the step #8 is followed by the SLIP KEY step #17 to determine whether or not the slip adjustment has been instructed, and since in this case no instruction to perform the slip adjustment is given, the step #17 is in turn followed by the FLAG AT bn step #18 to set the flag at the area b1. Then, the data of the daily sales for each item, which are stored in the area d1 are sequentially read out as shown by a dn DATA READ-OUT block #11, the data in turn being printed on a journal by the printer 10 to provide an adjustment report of the daily sales for all items as shown by a PRINTING block #12.

Figure 3:
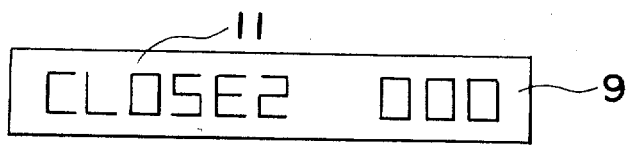
FIG. 3 is a diagram showing a display of a machine-locked condition.

Upon completion of this adjusting operation as determined during a determining step shown by a COMP.? block #13, the CPU 1 causes the mode information (i.e., information of the first check and adjustment mode in the instance so far described) stored in the RAM area a to be stored in the area c of the memory unit 8 as shown by a STORAGE AT AREA c block #14 and develops an instruction to lock the machine after having determined that the flag is set in the area b1 as shown by an INSTRUCTION TO LOCK MACHINE block #15. The machine-locked condition is then displayed by the display unit 10, as shown by a DISPLAY OF MACHINE LOCK block #16, in a manner as shown in FIG. 3.

Hereinafter, the operation necessary to issue a slip adjustment report will be described.

Figure 2:
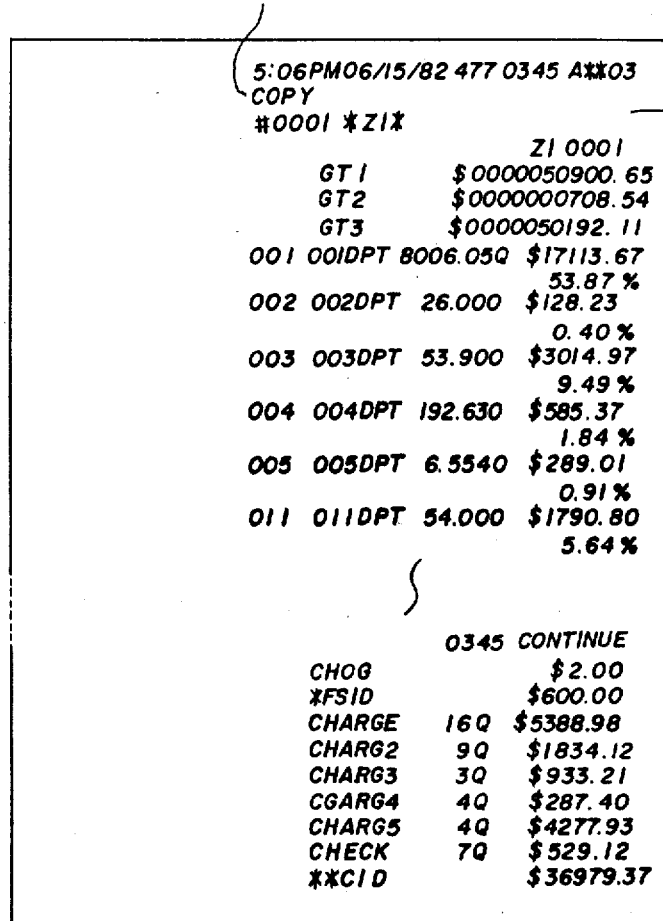
FIG. 2 is a schematic diagram of a slip showing an example of the slip adjustment report printed thereon.

During the machine-locked condition that is established, for example, after the execution of the above described adjustment of the daily sales for all items, where a slip adjustment report on the daily sales for all items is desired, the JOB number (for example, "1") associated with the adjustment of the daily sales for all items, the JOB specifying key #, and the slip adjustment specifying key slip have to be successively manipulated to instruct the CPU 1 to carry out a slip adjustment of the daily sales for all items as shown by the block #7. In response to the instruction given to the CPU 1 in the manner as hereinabove described, the CPU 1 determines, as shown by the block #8, whether or not the flag is set in the area b1 of the memory unit 8. Since the flag is set in the area b1 in the example now under discussion, the step #8 is followed by the step shown by a "COPY" PRINTING block #9 to effect the printing of a word "COPY" on a slip by means of the printer 10. Thereafter, the data of the daily sales for each item stored in the area d1 are successively read out as shown by the block #11, which are in turn printed on the slip by the printer 10 during the subsequent step #12 thereby providing an adjustment report 12 of the daily sales for all items as shown in FIG. 2. It is to be noted that, in FIG. 2, the word "COPY" shown by 13 indicates that the report is a copied report.

Figure 4:
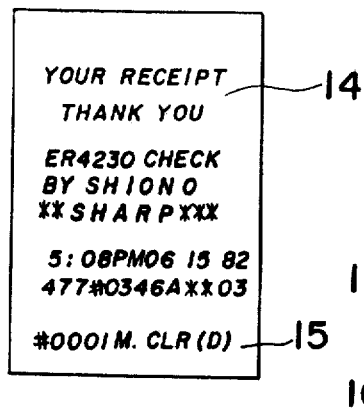
FIGS. 4 and 5 are diagrams of respective receipt journals showing examples of information printed during the clearing operation of a memory.

By performing the above described slip adjustment instruction as desired, copies of the adjustment report of the memory d1 associated with the daily sales for all items can be obtained on as many respective slips as desired.

Where the memory is desired to be subsequently cleared during the first check and adjustment mode, a JOB number (for example, "99"), the JOB specifying key # and the executing key TL have to be successively manipulated to instruct the CPU 1 to clear the memory as shown by an INSTRUCTION TO CLEAR MEMORY block #31. The CPU 1 then reconfirms, as shown by a RECONFIRMATION OF FLAG AT bn block #32, the setting of the flag at the area b (b1 to bn) of the memory unit 8 and clears the contents of the memory d in which the flag has been set (particularly, the contents of the memory d1 because the flag is set at the area b1 in the instance now under discussion) as shown by a TO CLEAR MEMORY bn block #33. The step #33 is followed by the RELEASE OF FLAG AT bn block #34 to release the flag information in the memory b, and the memory area of which contents have been cleared is printed by the printer 10 on the receipt journal 14 as shown in FIG. 4, as shown by a PRINTING block #35. It is to be noted that, in FIG. 4, the printed area shown by 15 indicates that the contents of the memory d1 (#0001) associated with the daily sales for all items which have been cleared.

The release of the flag in the memory b during the step #34 results in the release of the machine from the locked condition and the cash register is restored to a normal stand-by position with the display unit 9 consequently displaying "0.00".

Where, during the machine-locked condition that has occurred subsequent to the memory adjustment for the daily sales for all items as hereinbefore described, the receipt journal adjustment of other sales memories, for example the adjustment of the memory for the storage of the sales for each time interval (receipt journal printing), is desired to be performed, a JOB number (for example, "4") associated with the sales adjustment for each time interval, the JOB specifying key # and the executing key TL have to be successively manipulated to instruct the CPU 1 to perform the required adjustment as shown by the block #7. In response to this instruction, the CPU 1 performs the determining step #8 to determine whether or not the flag is set in the area b4 and then execute the steps #17, #18, #11, #12 and #13 successively in a manner similar to that occurring during the adjustment of the daily sales for all items as hereinbefore described, thereby causing the printer 10 to print the desired adjustment report of the sales for each time interval on the receipt journal.

Figure 5:
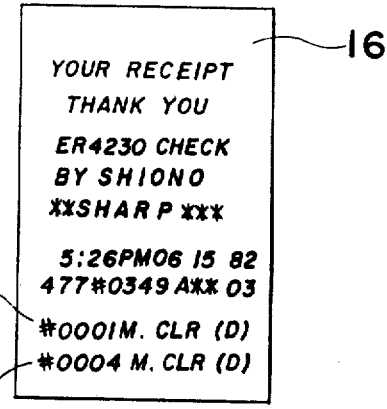

If the above described memory clearing operation (the steps #31 to #35) is executed during this condition to release the machine from the locked condition, the contents stored in the data storage area d1 for the storage of the data of the daily sales for each item and the data storage area d4 for the storage of the data of the sales for each time interval are cleared in response to the setting of the flag at the memory areas b1 and b4, respectively, and the respective condition being then recorded on a receipt journal as shown in FIG. 5. It is to be noted that, in FIG. 5, the printed areas shown by 17 and 18 indicate, respectively, that the memory d1 (#0001) associated with the daily sales for all items and the memory d4 (#0004) associated with the sales for each time interval have been cleared.

If the check adjustment operation by means of the slip printing is executed with respect to the memory area d for which no check and adjustment operation by means of a receipt journal printing is executed, the result of the determination at the step #17 would be Yes and an error display will subsequently be developed as shown by an ERROR DISPLAY block #19. That is, care is taken to avoid the possibility that the slip adjustment report may be obtained before the receipt journal adjustment.

In summary, after the adjustment (R/J Print) of the memories associated with the various sales, for example, after the memory adjustment for the daily sales for all items during the first check and adjustment mode, the machine-locked condition is established before the memory is cleared and, under the machine-locked condition, the key manipulation (for the checking and adjusting of the memory for the daily sales for each item) required during the first check and adjustment mode is enabled and, at the same time, copies of the adjustment report of the memory for the daily sales for all items can be made as many as described. Thereafter, if the memory clearing procedure is executed during the first check and adjustment mode, the memory for the daily sales for all items are cleared, releasing the machine from the locked condition to allow it to resume the normal stand-by position.

Moreover, where during the machine-locked condition, subsequent to the memory adjustment of the daily sales for all items, the receipt journal adjustment of the other memory for example the memory adjustment for the sales for each time interval by means of the receipt journal printing, is executed. Two types of slip adjustment reports (copy) are then obtainable under the machine-locked condition, for all items and the sales memory for each time interval, respectively. In addition, the subsequent memory clearing procedure results in the clearing of the daily sales memory for all items and the sales memory for each time interval. A similar description applies even where there or more type of adjustments occur in overlapping relation.

Thus, an important feature of the present invention is, subsequent to the adjustment of the various sales memories, the machine-locked condition is established before memory clearing and, if it is the first check and adjustment mode, only the key manipulation associated therewith is enabled.

During that machine-locked condition, copies of the sales adjustment report (Receipt journal printing) which has constituted a cause of the locked condition can be made on as many slips as described in the form of the slip adjustment reports.

If the memory clearing procedure is subsequently carried out during the same mode, the contents of the sales memory which has constituted a cause of the machine-locked condition can be cleared and the machine-locked condition is released to restore to the normal stand-by position.

It is to be noted that, according to the present invention, the procedure of the key manipulation may not be limited to that described hereinabove, but various modifications such as, for example, the use of specific keys for a particular command or operation, or the concurrent use of some keys in the keyboards utilized during the other mode of operation, are possible to those skilled in the art.

From the foregoing, it has now become clear that as many copies of the adjustment reports as desired can be obtained on receipt journal during the machine-locked condition subsequent to the printing of the adjustment report on the receipt journal.

Since the machine-locked condition occurs after the printing of the adjustment report on the receipt journal and before the memory clearing, and the key manipulation is therefore inhibited during the other mode, there is no possibility of the contents of the memory changing when the slip adjustment report is desired to be issued. Thus, it is possible to obtain accurately copied reports.

Under a certain machine-locked condition, the receipt journal adjustment of another kind of report may be carried out. On the other hand, under the same machine-locked condition, it is possible to obtain the slip adjustment reports (copies) of various kinds.

The single memory clearing procedure is enough to clear the memory and, hence, to release the machine from the locked condition.

Furthermore, according to the present invention, since the contents of the memory adjusted after the completion of the adjustment operation are not automatically cleared, a plural number of the same adjustment report can be prepared. In addition, since the machine-locked condition can be established in response to the adjustment operation, any possible change in the contents of the memory between the first issued adjustment report and the subsequently issued adjustment reports can be avoided, enabling the issuance of the accurately copied reports.

Although the present invention has been fully described in connection with a preferred embodiment thereof with reference to the accompanying drawings, it should be noted that various changes and modifications are apparent to those skilled in the art. Such changes and modifications are, unless they depart from the scope of the present invention as defined by the appended claims, to be understood as included therein.

We claim:

1. An electronic cash register comprising:
   mode selection means for selecting between at least a registration mode and a check and adjustment mode;
   means, operative during said registration mode selected by said mode selection means, for registering transactions, a record of said transactions being stored in a cash register memory;
   adjustment means, responsive to the selection of said check and adjustment mode, for executing an adjustment operation by adjusting the record of said transactions stored in said cash register memory while retaining the record of said transactions prior to said adjustment operation, said adjustment operation selected from a group consisting of the adjustment of monthly sales for all items, the adjustment of the sales of all cashiers, the adjustment for all clerks, the adjustment of the sales for each time interval, the sales adjustment of the price look up function, the adjustment of monthly sales for all clerks and the adjustment of monthly sales for all departments;
   machine-locking means, responsive to the adjustment operation performed by said adjustment means, for establishing a machine-locked condition to thereby inhibit introduction of transaction information ito said cash register during said check and adjustment mode; and
   means, operative subsequent to the operation of said adjustment means, for clearing the record of said transaction prior to said adjustment operation, stored in said cash register memory, as retained by said adjustment means, said means for clearing disabling said machine-locking means.

* * * * *